United States Patent
McElwee et al.

(10) Patent No.: US 10,097,517 B2
(45) Date of Patent: Oct. 9, 2018

(54) SECURE TUNNELS FOR THE INTERNET OF THINGS

(71) Applicant: ZitoVault, Inc., Carlsbad, CA (US)

(72) Inventors: Timothy McElwee, Carlsbad, CA (US); Gang Ding, Carlsbad, CA (US); Ron Keidar, Carlsbad, CA (US)

(73) Assignee: CyberSight, Inc., Carlsbad, CA (US)

( * ) Notice: Subject to any disclaimer, the term of this patent is extended or adjusted under 35 U.S.C. 154(b) by 48 days.

(21) Appl. No.: 15/254,368

(22) Filed: Sep. 1, 2016

(65) Prior Publication Data

US 2018/0063079 A1   Mar. 1, 2018

(51) Int. Cl.
| | |
|---|---|
| *H04L 29/06* | (2006.01) |
| *H04L 9/16* | (2006.01) |
| *H04L 12/28* | (2006.01) |
| *H04L 12/24* | (2006.01) |
| *H04L 29/08* | (2006.01) |

(52) U.S. Cl.
CPC .............. *H04L 63/029* (2013.01); *H04L 9/16* (2013.01); *H04L 12/2854* (2013.01); *H04L 41/046* (2013.01); *H04L 63/0464* (2013.01); *H04L 63/0492* (2013.01); *H04L 67/10* (2013.01); *H04L 67/12* (2013.01); *H04L 2209/805* (2013.01)

(58) Field of Classification Search
CPC ..... H04L 63/029; H04L 63/0492; H04L 9/16; H04L 63/0464; H04L 41/046; H04L 67/10; H04L 67/12; H04L 12/2854; H04L 2209/805
See application file for complete search history.

(56) References Cited

U.S. PATENT DOCUMENTS

| | | | |
|---|---|---|---|
| 2005/0102509 A1 | 5/2005 | Fascenda | |
| 2015/0188949 A1* | 7/2015 | Mahaffey | H04L 63/20 726/1 |
| 2015/0229654 A1 | 8/2015 | Perier | |
| 2016/0301779 A1* | 10/2016 | Cui | H04L 45/308 |
| 2017/0187703 A1* | 6/2017 | Enrique Salpico | H04L 63/0236 |
| 2017/0237719 A1* | 8/2017 | Schwartz | G06F 21/602 713/153 |

* cited by examiner

*Primary Examiner* — Mahfuzur Rahman
(74) *Attorney, Agent, or Firm* — MU P.C.

(57) ABSTRACT

A system for the maintenance and creation of security tunnels between IoT devices and IoT cloud servers, comprising the steps of receiving one or more packets from one or more IoT devices in a smart router, routing the one or more packets to an agent within the router, the agent performing one or more services on the one or more packets, routing the one or more packets to a WAN port of the router, and sending the one or more packets by a cloud secure tunnel to one or more IoT cloud servers. The system may have secure tunnels that are formed between the IoT devices using a unique password for each IoT device. The additional step of selectively stopping communication between the IoT devices and the router, wherein when the communication of one IoT device to the router is compromised, the remaining tunnels with unique passwords are integral.

9 Claims, 3 Drawing Sheets

End-to-End Virtual Tunnel

SECURE TUNNELS FOR THE INTERNET OF THINGS

BACKGROUND OF THE INVENTION

1. Field of Invention

The present invention relates to the field of secure communications between the IoT devices and routers, and routers and the cloud, preferably in the Internet of Things.

2. Description of Related Art

The Internet of Things (IoT) comprises a network of physical objects embedded with IoT devices, electronics and network connectivity that enables the collection and exchange of data through networks. Currently, IoT involves appliances in the house, such as refrigerators, washers/dryers, televisions and home comfort such as smart thermostat systems. The appliances communicate with a router and transfer the information they collect in an unencrypted and insecure form. Other Internet of Things implementations may be found in cars and trucks, wherein a network of computationally-weak IoT devices communicate with a processor to process the data produced by the IoT devices.

Other uses for the IoT are in environmental monitoring (monitoring air or water quality, atmospheric or soil conditions), infrastructure management (IoT devices on bridges, railway tracks and wind farms, for example). In manufacturing, IoT is applied to manufacturing equipment and process controls. Healthcare uses IoT to process signals from patient monitors and monitors of the systems.

IoT devices are relatively simple, electronically, and lack computational power. A IoT devices may be constrained by one or more of i) low computing power, ii) small memory for data storage, iii) battery operation and lack or electrical power, iv) low communication rate and short packet length, v) short transmission range so multi-hop mesh networking is required, and iv) infrequent or lack of firmware upgrades over the life of the IoT device. The reasons for this simplicity are manifold, many IoT devices are generated by small companies with limited resources wherein security may not be a consideration or is not amongst the skill-set of those teams. Security may not be prioritized due to Time-to-market and lack of return on investment. A lack of capability or availability of automatic remote upgrade makes security an issue for the lifetime of the product, which may span 10 to 20 years.

Typical implementations of IoT devices rely on unencrypted data connections between the IoT device and a processor or router. Communications may be wired or wireless, the former typically in the form of a serial connection, and the latter employing Bluetooth, Wi-Fi, IEEE 802.15.4 based protocols such as Zigbee or Thread, or simply near-field. Due to the lack of computational power, or as a result of an oversight of manufacturers, for the most part the communications between the IoT devices and processor or router are unsecure and unencrypted as described above.

Concerns have been raised in the IoT sphere regarding the security of the IoT devices and the data that is being collected. In addition, the IoT devices may collect information that is deeply personal, for example in the case of baby monitors and voice or video recorders, and this information may be intercepted and distributed. In the home, opening a garage door or unlocking a main door remotely, or disabling an alarm system, are examples of everyday activities using IoT devices that would benefit from security. Computer-controlled components in vehicles may be hijacked to cause unsafe vehicle conditions, for example, brakes may be disabled or throttle controlled remotely by hacking. In manufacturing, defects may be introduced by a man-in-the-middle attack, intercepting a IoT device's signal and producing false IoT device feedback to the process controller. For example, in Wi-Fi, the communication between all devices and their access point is encrypted as well and each connection to the access point has a unique key. However, since all devices have the same passphrase (password) that is used to establish the session (tunnel) key, anyone that listens to the session establishment and knows the Wi-Fi passphrase can calculate the session key and then eavesdrop on that "tunnel" or spoof or impersonate the other device.

Based on the foregoing, there is a need in the art for security within the IoT realm between the IoT devices and router, and between the router and the cloud that is the ultimate destination of data produced by the IoT devices, with the router providing services that include secure tunnels to the IoT devices. In addition, given disparate security systems the router or processor would preferably translate the secure data to permit an uninterrupted channel for data communication.

SUMMARY OF THE INVENTION

A system for the maintenance and creation of security tunnels between IoT devices and IoT cloud servers, comprising the steps of receiving one or more packets from one or more IoT devices in a smart router, routing the one or more packets to an agent within the router, the agent performing one or more services on the one or more packets, routing the one or more packets to a WAN port of the router, and sending the one or more packets by a cloud secure tunnel to one or more IoT cloud servers.

The system may have secure tunnels that are formed between the IoT devices using a unique password for each IoT device. The additional step of selectively stopping communication between the IoT devices and the router, wherein when the communication of one IoT device to the router is compromised, the remaining tunnels with unique passwords are integral.

The service may involve decrypting the one or more packets, and re-encrypting the one or more packets before routing the one or more packets to the WAN port, and/or decrypting the one or more packets with a first protocol, and re-encrypting the one or more packets with a second protocol. The additional step of configuration information for the service being sent via a Config Agent to the agent in the router. The router may use a look-up table to find the password for an IoT device based on its MAC address, and to attribute the communication to the IoT device.

The services may be selected from the group consisting of encryption and decryption, event attestation, second authorization, storage, compression and a computationally lightweight algorithm. The router filters the one or more packets incoming from the IoT devices by network addresses, ports connection state, or application level filtering.

The system may have the further steps of creating one or more encrypted tunnels between one or more IoT cloud servers to a smart router using a unique password for each IoT cloud server, sending one or more packets between the IoT cloud servers and smart router, routing the one or more packets to an agent within the router, the agent performing one or more services on the one or more packets, routing the one or more packets to a IoT port of the router, and sending the one or more packets to one or more IoT devices.

A device for the maintenance and creation of security tunnels between IoT devices and IoT cloud servers is disclosed having a router comprising, an IoT port adapted to connect to one or more IoT devices wirelessly or wired, through a LAN for example, a WAN port adapted to connect to one or more IoT cloud servers, a filter separating packets passing through the router from IoT cloud packets that have a destination address of at least one IoT cloud server, an agent having one or more services to be administered to a packet entering the agent, a direct line to the WAN port for the packets passing through, a first active service path connected between the IoT filter and the agent, a second active service path connected between the agent and the WAN filter, the paths adapted for transmission of the IoT cloud packets, a WAN port connected to the WAN filter, adapted to forward the IoT packets, and a configuration agent securely connected to the router, adapted to securely provide configuration information from the IoT cloud to the router, wherein the configuration information informs the agent.

One or more services may involve at least decrypting the packet and re-encrypting the packet. The decrypting the packet uses a first cryptographic algorithm, and wherein the encrypting the packet uses a second cryptographic algorithm.

A system for the maintenance and creation of security tunnels between IoT devices and IoT cloud servers may have the steps of creating one or more encrypted tunnels between a router comprising an agent and one or more IoT cloud servers, sending one or more packets from the one or more IoT devices to the smart router, the agent identifying a tunneling service associated with each of the packets between the IoT devices and the cloud routers, wherein the tunneling service is associated with an incoming packet from the cloud, and the router sends this packet for decryption at the associated tunneling service. The system may also have the step of sending one or more packets between one or more IoT devices and their cloud servers through the smart router.

A system for the maintenance and creation of security tunnels is additionally disclosed wherein the agent encrypts the packet received from the IoT router and sends the packet to the IoT cloud server. A system for the maintenance and creation of security tunnels between IoT devices and IoT cloud servers through a router is disclosed, wherein the router has an agent capable of supporting many tunnels between IoT devices and IoT cloud servers, using remote configuration server that manages router agents capable of performing services on the packets. The router contains an agent that performs services on the packets passing through, such as decrypting incoming packets and re-encrypting outgoing packets with a different encryption algorithm. The IoT cloud server are capable of identifying which routers have specific IoT devices on their LAN and configure those routers to capture those IoT devices communication and route it through the designated tunnel. Optionally, each tunnel may use a unique password, enabling the IoT device to achieve end-to-end encryption with the router without intervention from IoT cloud servers.

The endpoint may be an IoT Internet cloud server, and the smart router translates the communication received from the IoT devices to a different encryption before sending same to cloud, by means of the agent.

The system may also have the router using a look-up table to find the password for an IoT device based on its MAC address, and to attribute the communication to the IoT device. The router may also provide one or more services to the IoT device, the services selected from the group consisting of event attestation, second authorization, storage, compression and a computationally light-weight algorithm.

A device for the maintenance and creation of security tunnels between IoT devices and IoT cloud servers may have a router comprising an IoT port adapted to wirelessly connect to one or more IoT devices, a WAN port adapted to connect to one or more IoT cloud servers, a filter separating packets passing through the router from IoT cloud packets that have a destination address of at least one IoT cloud server, an agent having one or more services to be administered to a packet entering the agent, a direct line to the WAN port for the packets passing through, a first active service path connected between the IoT filter and the agent, a second active service path connected between the agent and the WAN filter, the paths adapted for transmission of the IoT cloud packets, a WAN port connected to the WAN filter, adapted to forward the IoT packets, and a configuration agent securely connected to the router, adapted to securely provide configuration information from the IoT cloud to the router, wherein the configuration information informs the agent.

One or more services may include at least decrypting the packet and re-encrypting the packet, and decrypting the packet may use a first cryptographic algorithm, and wherein the encrypting the packet may use a second cryptographic algorithm The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
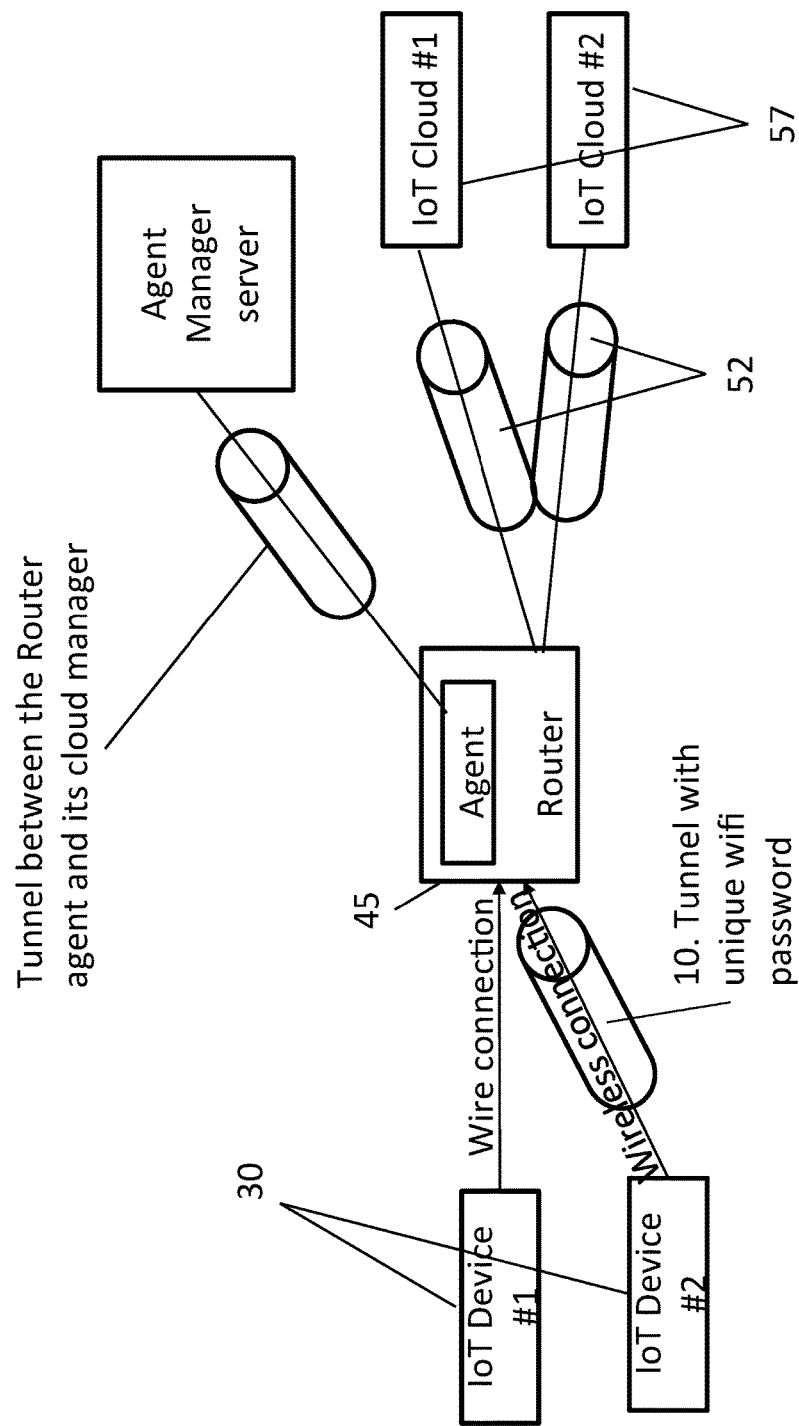
FIG. 1 is a functional diagram of IoT network with secure tunnels, according to an embodiment of the present invention.
Figure 2:
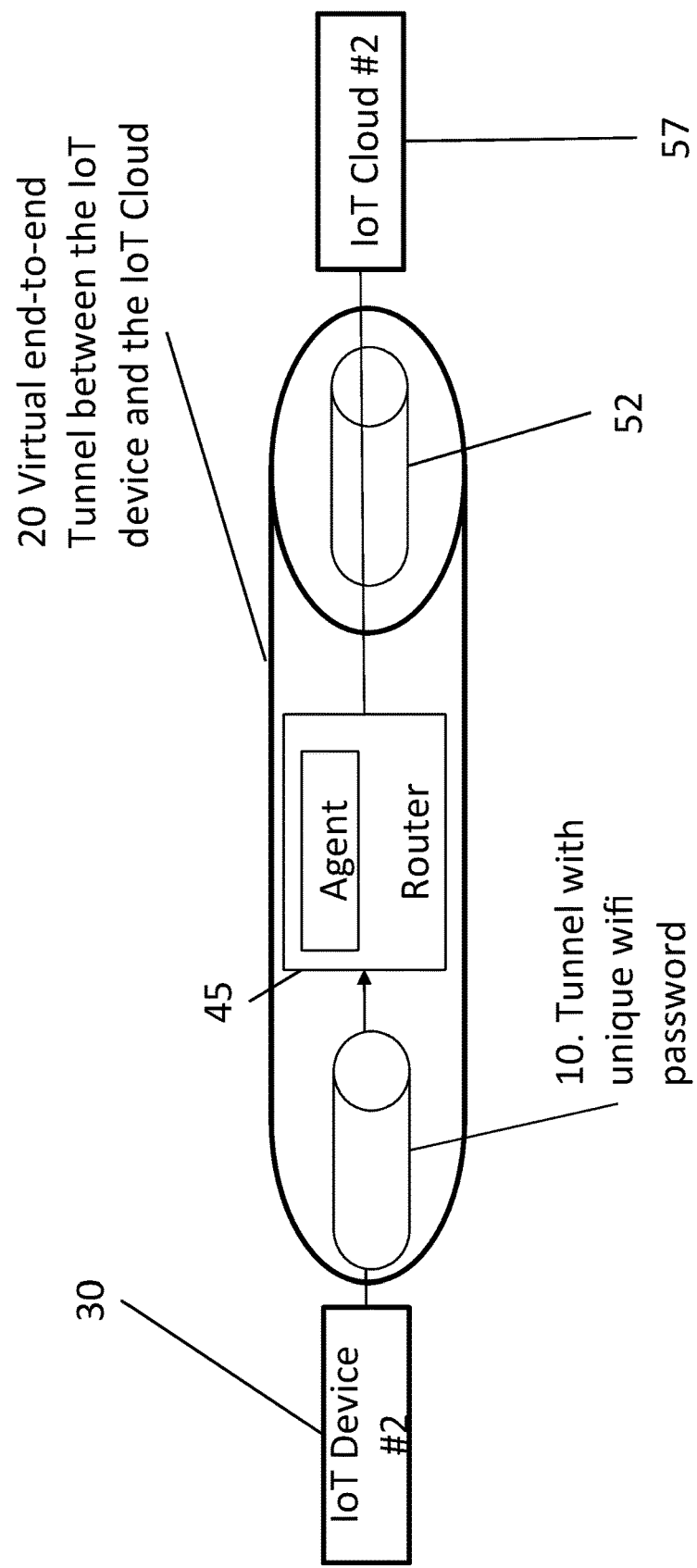
FIG. 2 is a functional diagram of the home IoT network, according to an embodiment of the present invention.
Figure 3:
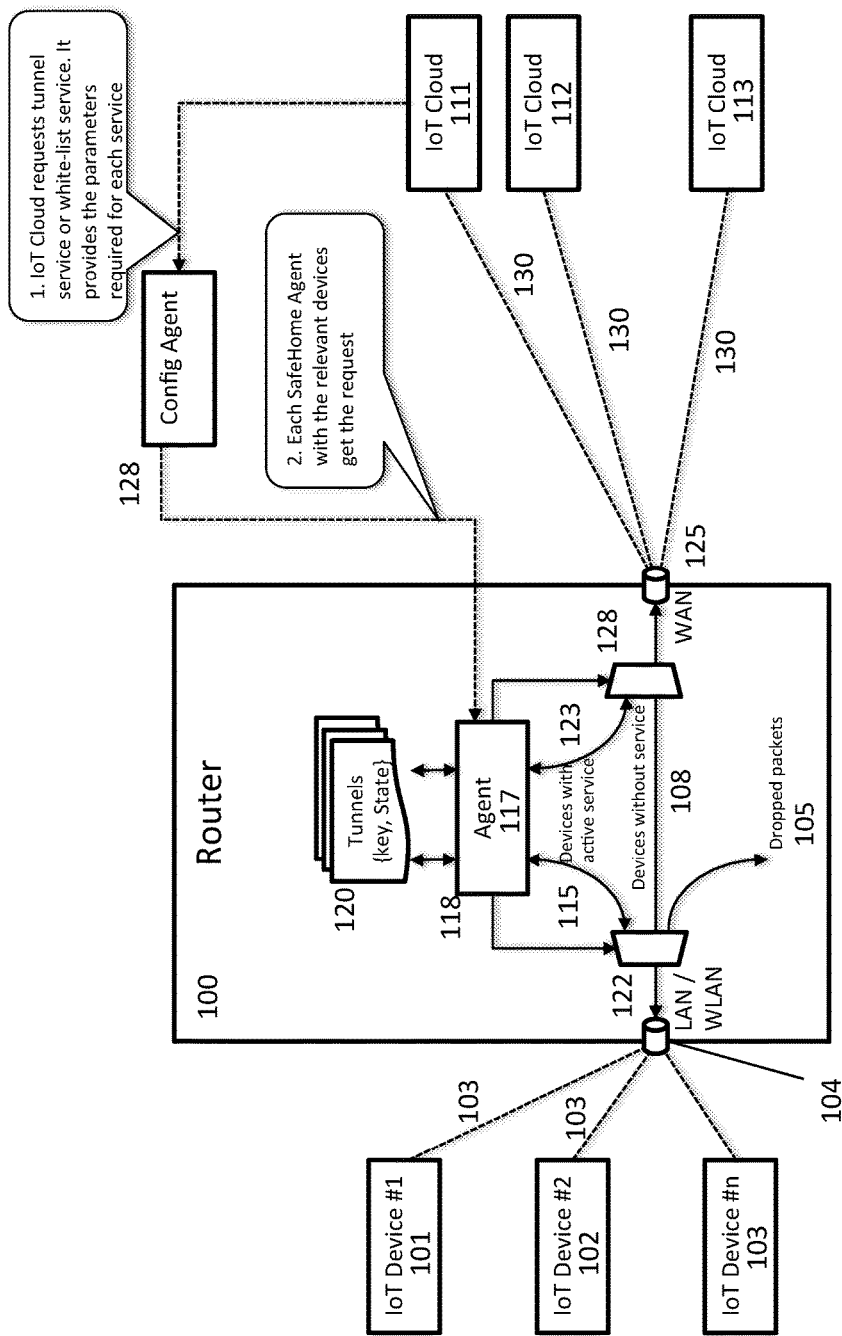
FIG. 3 is a functional diagram showing data flows within a method of securing an IoT network.

Preferred embodiments of the present invention and their advantages may be understood by referring to FIGS. 1-3, wherein like reference numerals refer to like elements.

IoT devices have the most data, but the least capability. For a number of reasons, cost and size limitations among them, IoT devices have low power and transmit the data to a smarter device, having higher processing power, for processing. The smarter device, usually a router or processor, has a higher speed network connection. Smarter devices also perform filtering, monitoring (making sense of the IoT device data) and attack detection. The cloud receives the processed data from the smarter device and distributes it to other devices and users. The cloud has the least amount of data from each device, but has the highest capacity to manage many IoT devices.

The invention including services presented herein are designed to address legacy deployment and future deployment of IoT devices that end up installed without security or a clear upgrade path, and without means to modify or replace the device to provide these. One service offered by the router is the creation of one or more secure tunnels. In the case of autonomous service at home, the router tunnel will exist through the Wi-Fi. In the case of a tunnel to the cloud destination, it must be coordinated with the cloud server as the cloud server is needed to create the tunnel, on an on-demand and per device basis. The router also provides the service of firmware upgrades, a service that may be requested by the user or device manufacturer. The router may assist in reducing IoT activity by managing its Keep-Alive and accumulating its reports. Owing to its higher computing power, additional services may be hosted on the router Services that may be employed by the smart router are secure tunnels over Wi-Fi, and managed tunnels with the IoT cloud server. The combination of these two enables end-to-end encryption for a device that is otherwise not capable for transport layer encryption. Device manufacturers may run some code as a service in the router, and third parties may run other services e.g. IoT Hub (an application that collect and connect all the IoT devices using common protocols like AllJoyn, Thread, Homekit, etc.)

With reference to FIGS. 1 and 2, a number of secure tunnels (using encryption and keys, wherein both endpoints have the keys to decrypt but the midpoints do not) are formed between the IoT device and some of the other connected devices to encrypt data transmitted by the IoT device and keep the connection secure. A second secure tunnel 10 is formed between the IoT device and the smart router 45. The encryption of the tunnel is adjusted to take into account the computational power of the IoT device. When combined, the two services enable end-to-end encryption for an IoT device to otherwise lacking in encryption capabilities.

A secure tunnel 25 is formed between the IoT devices 30 and the smart router 45. The IoT devices are generally of low computational and battery power, and the signal may be required to hop one or more times in a limited distance, across other IoT devices or directly to the smart router. The smart router may provide updated firmware to the IoT devices 30 to provide an encryption process tailored to the computational power of the IoT device. In some embodiments a firmware update operation can work from the LAN but not from the WAN, wherein upgrade from the WAN requires the device to upgrade itself. Reasons for failure to update from the WAN may be that the device firmware does not support the WAN, in other cases the device storage is not large enough or the device failed to upgrade itself and requires a recovery procedure that is only possible from the LAN. In these cases, the router has an interface on the LAN and so the agent can get the firmware from the IoT OEM along with a script that performs the upgrade, and run them as a service. In an embodiment, the smart router is the proxy, running a light-weight routing protocol to communicate with IoT devices, and authenticate new IoT devices. Authentication may work with an external trusted authenticator, and generate and maintain keys with IoT devices. The router also collects IoT device information. The router filters IoT data traffic and restricts outgoing data to useful data only, and it detects malicious activities to, from or among the IoT devices such as IoT devices.

In an embodiment, the IoT devices run light-weight and power efficient protocols. Due to limited transmission range, the IoT devices may use a light-weight mesh routing protocol to reach the IoT router, such as RPL. Further, new IoT devices authenticate via the router to get a new key, and use network or application layer security protocol, such as compressed IPsec or DTLS. While powerful IoT devices are capable of communicating directly with the smart router, some low-end IoT devices may use an IoT router as a proxy to communicate with the smart router. The IoT router encrypts the outgoing signal to the smart router, and is able to create a secure tunnel with the smart router. The IoT router performs a pass-through function from the IoT device signal, transmitting and translating the signal to the higher-level encryption used in the tunnel between the IoT router and the smart router. A further tunnel 40 is formed between the IoT router and the smart Router 45. For a longer tunnel, several secure tunnels are interconnected by secure translation taking place at the connecting nodes (IoT router, smart router). Additional tunnel 52 provides secure communication between the smart router 45 and IoT cloud, and end users, respectively. One embodiment provides cooperation of a number of tunnels through secure translation by routers acting as proxies, to create a secure tunnel from end-to-end. The end-to-end tunneling may be formed by direct tunneling, namely from every IoT device and IoT device to the IoT cloud, or indirect tunneling through a dedicated Security Tunnel Cloud Service. The present invention does not specify tunnels, and is not dependent on TLS or DTLS in the transport layer, rather it works in multiple layers. The translation of the present invention also provides services, not simply sending the data through, rather the translation can modify or add encryption, or other services. The smart router may be connected to the IoT devices 30 one side, and with the user devices on the other. The smart router 45 translates from one secure tunnel 40 to the other secure tunnel 52 to maintain a secure tunnel extending between the IoT devices 30 through the smart router 45 and the cloud service 57. The smart router 45 does this by diverting the one or more packets involved in the communication, decrypting them using one protocol, and encrypting the one or more packets using another protocol, for transmission into the cloud.

The IoT devices 30 may be connected directly to the IoT cloud servers 57 through a combination of secure tunnels 25, 40 and 52, resulting in secure tunnel 20. The data comes into the router 45 where it is processed by an agent (not shown). The agent performs services on the data and the data is sent onward to the cloud 57. The services may involve decryption of the incoming data, and re-encryption of outgoing data in order to continue the secure tunnel 20, among other data processing activities, and the router will have access for a moment to the unencrypted data before it is re-encrypted. It may analyze the unencrypted data before forwarding said data. The cloud 57 may directly authenticated the IoT device via a trusted authenticator. To reduce bandwidth use and packet loss, the smart router assembles multiple small IoT packets into one large Internet packet, filters IoT data traffic to transfer only the necessary data to the cloud, and converts addresses between the IoT (e.g. IPv6) and the Internet (e.g. IPv4). In order to encrypt the information from the IoT devices, the smart router decompresses the short header from IoT packets and applies a regular encryption header for packets to the cloud.

The secure tunnel 20 allows the IoT devices to communicate with the IoT cloud server through the router, and requires no changes to the IoT devices. The tunnel 20 is transparent to the IoT device. The router also applies the tunnel service automatically to packets that are correctly routed to the IoT cloud server as the ultimate destination, to be diverted to the agent such that the agent may apply the service(s).

The service may also be automatically maintained in that identified IoT devices' firmware may be updated by the router. In one embodiment, the cloud service sends certificates and private keys to the IoT cloud server and to the router(s) 45 behind which one or more identified IoT devices are connected. The IoT cloud server then activates the tunnels service on any connection between the router and IoT cloud, and the tunneling protocol uses the certificate and key to establish the tunnel. The IoT cloud may disable the tunnel at any time, for example to support a subscription service, or replace keys frequently to support key expiration.

In an example, IoT company asks to have a tunneling service between its IoT devices and the IoT cloud, which is not inherent in the IoT devices and the IoT devices have no firmware upgrade capability. One or more connections between the router and the IoT cloud would be identified as requiring tunneling service, and the tunneling protocol would use the certificate and keys create a secure tunnel.

The IoT devices 30 may be connected directly to the end user through a combination of secure tunnels 25, 40, 52 and 57. In one embodiment, the IoT device and the user run the same security protocol (compressed IPsec or DTLS), with the router performing the necessary translation, and in another embodiment, the cloud maintains security to both the smart router and the user, with typical Internet encryption or proprietary encryption.

In contrast to the IoT devices 30, which are generally computationally weak, a number of smart devices may be connected directly to the smart router through encrypted connections 40. As the devices are smart, a high-level encryption process is generally present within the firmware of the device to form a secure tunnel link with the smart router. The router contains a number of encryption schemes therein to connect at the highest level of encryption available to the smart device Optionally, in the second tunnel (between the IoT devices and the smart router) IoT devices on the Wi-Fi LAN operate each using a different password, instead of all sharing the same password as is typical in Wi-Fi. Each device does not know it has a unique password, so it encrypts its content according to the standards and protocols of wireless specifications. The smart router on the other hand uses a different password to each device based on its MAC address, so it may not be aligned with typical Wi-Fi implementations but the end-devices are not aware of it. In one embodiment, the IoT device—smart router tunnel uses WPA2 encryption, and there is a different set of keys for each tunnel instance. Therefore the smart router is able to monitor each IoT device individually for compliance with security policies and procedures. The addition of a new device to the network (onboarding) is performed by the router generating a password for the device and sending it to a user's phone. The user inserts the password into the IoT device, such that the IoT device may access the router, but has a unique password, different from the other devices, to do so. As a result, the device may be uniquely identified by the router, and compromising the password of the single device does not compromise the whole system.

The system knows when a connection is insecure by monitoring the device, the connection/device or connections to the cloud. A device exhibits a known malicious behavior pattern e.g. it scans ports, sends packets with known error, or sends incomplete message flows, etc. which may be determined locally by the router. in the case of a connection/device, a device may connect with a site outside of its white-list, wherein the other side of the device is either a remote site or a local device. A policy may be set up to block that interaction, or the server in the cloud may be consulted. In monitoring the connections to the cloud, the cloud server may decide a connection or device is not well behaved and block it, and it may consult the home owner in making that decision, or use a history of similar situations at other homes.

Establishing a Wi-Fi secure connection, for example when a device wakes up or enters the range of the Wi-Fi router is performed by establishing a secure connection between the IoT device and router, which may be achieved in the usual way according to Wi-Fi specifications. In order to communicate with each device, the router uses a look-up table to find the password for that device based on its MAC address, and to attribute the communication to that device. From that point the router proceeds according to the usual protocol.

In this manner a secure tunnel may be achieved between the router and virtually any device capable of Wi-Fi encryption without changing the software or hardware of that device, and simply using a typical Wi-Fi implementation with unique passwords. The separate IoT device—smart router tunnel and smart router—cloud tunnels as described herein are generally not required where an end-to-end tunnel solution is provided between the router and device capable of Wi-Fi encryption.

With regard to FIG. 3, example IoT devices 101, 102 and 103 communicate with a first IoT port 104 of the smart router 100. In summary, firstly the packets are identified, secondly they are sent to the service, thirdly the service is performed (in this embodiment, decryption and subsequently encryption) and fourthly the newly-encrypted packet is directed to the destination.

A number of packets will emanate from the IoT devices 101, 102, 103 containing information on the activity of the IoT devices. The packets are transmitted through the network and arrive at the router through port 104. The packet contains a header at one end, a footer at the other, and a plurality of data therebetween. The data contained within the packets are encypted by WPA2 or another protocol available to the IoT devices, whereas the header and footer information remains unencrypted to permit correct routing of the packet and data on size of the packet, for transmission and error-correcting efficacy. The packets are transmitted to the router by wired or wireless means, and arrive at the router's port.

In some embodiments the port 104 has a firewall or filter 122 that filters incoming traffic by network addresses and ports of the packet. It effectively blocks entry of the packets that are unauthorized, and permits the entry to the router of authorized packets. In other embodiments, the firewall retains enough packets to make a determination of a packet's connection state. Application level filtering may also be used to understand the applications and protocols for which the packets are being used and filter according to application. There is a filter 122 on the IoT side of the router 100, and a further filter 128 on the cloud side of the router 100. The further filter 128 performs filtering and firewall on traffic coming in from the cloud or WAN side through the router WAN port 125.

The packets coming in to the router are identified and categorized. Of the incoming packets, some may be dropped packets 105 as a result of errors or incorrect addressing, and others may pass through the no need for active service path 108, determined in one embodiment by the final intended destination of the packet, for example, detected and directed by a filter 122, 128. The filter 122, 128 may also act as a firewall to prevent the entrance of an unauthorized packet into the agent 117, wherein rejected packets become dropped packets 105. If the packet is directed to servers other than the IoT Cloud, then they may pass through the router without active service and be routed from the WAN port 125.

If the packets are directed to example servers in the IoT Cloud 111, 112, 113, the packet is sent or diverted to the active service path 115. If required by the packets, and to enable the service, the agent sets up the filters and the instance of the tunnel service. Packets directed to servers in the IoT cloud 111, 112, 113 pass into the agent 117 via the active service path. They are processed by tunnel service 118, wherein the tunnel that is formed between the IoT device 101 and the router 100 (in an embodiment WPA2) terminates as the tunnel is decrypted within the tunnels service 120. The unencrypted data is accessible by the router, and services such as data compression, data aggregation, or IoT cloud designated applications may be applied on the unencrypted data, and other services in addition to encryption/decryption to be performed on the packet before it is re-encrypted. To perform the services the packet is decrypted within the tunnel service, additional services are optionally performed, and subsequently re-encrypted for transmission to the IoT cloud servers 111, 112, 113, first moving into the Agent 117. For transmission through the Internet, the most commonly used encryption algorithms are TTL/TLS and DTLS, a variation of TLS.

Once the tunnel is established between an IoT devices and the router, services may be offered by the router to the IoT device, having features such as i) event attestation, ii) second authorization, iii) storage, iv) compression and v) a computationally light-weight algorithm. The services may also include a discovery or "identify" service, wherein the IoT device is identified passively by linking the MAC address to the device, however in other embodiments other identification protocols may be used. Event attestation provides a signed report to dedicated security cloud service when a packet of special interest is sent, for example as an emergency response. The router receives the message hash, time source, destination, and length and the router signs it and sends it to the dedicated security cloud or OEM cloud to authenticate the message from that source. A special command may require independent authorization from two sources to prevent a breach of cloud fake user command. The user command goes through the cloud and dedicated security cloud, and if the cloud is breached, commands from it will not pass the dedicated security cloud. For IoT devices with limited storage, the packet is routed to the router which collects and sends them to the cloud at a longer time interval. The long packet header and/or aggregate multiple short IoT packets may be compressed to reduce overhead and bandwidth usage, for further delivery. Simple security with local connections saves IoT device resources such as electrical and computation power, CPU usage and availability. The device may report with a simple protocol to the router, while the router acts as a proxy with full heavy security to the cloud, wherein the router may manage keep-alive messages for the IoT, and may have local storage for incoming and outgoing messages.

The encryption protocol of the IoT device—smart router tunnel may differ from that of the smart router—IoT cloud server tunnel, and the router "translates" between the protocols as it decrypts the packet or stream and subsequently re-encrypts it. In addition, each instance of a tunnel uses a different set of keys. Many tunnels may be maintained between the Router and separate IoT Clouds, and in an embodiment, there exist one or more for each IoT Device connections to its cloud. The Keys that are stored are used to establish tunnels with the IoT Clouds. There is a set of keys for each IoT Cloud. The newly encrypted packet is then transmitted through active service path 123 to the WAN port 125 of the router and onward through the smart router—cloud server tunnel 130 with a final destination of an IoT cloud.

The system provides a configuration agent for remote configuration of the router agent. From the IoT cloud 111 the configuration information is send via a configuration path that is separate from the path of the packets, through the configuration agent 128 and to the router. The config agent itself will have another set of keys to enable a secure connection with the Agent Management at the cloud In an embodiment, the configuration information enters the router and outputs a configuration for the encryption that is routed to the router 100 and interpreted by the agent 117. In this manner the control flow through the configuration agent 128 is separated from the data flow through the router 100. Exemplary configurations may include: delivery of public keys, request to generate private keys, associating certain keys with a tunnel, and tunnel configuration, (e.g. determining which IoT device uses a tunnel with which server and with which keys. Requests to activate a tunnel or deactivate it, e.g. based on a subscription service. may also be delivered through the configuration agent.

In order to determine which configuration information to transmit, the IoT cloud servers identify which routers have which specific IoT devices on their LAN, and then configure those routers to capture the specific communications of those IoT devices, and route the communications through the appropriate tunnel.

The filters 122, 128 examine each of the packets going in and out of the router 100, and may perform filtering or firewall tasks on incoming packets to route the packets properly according to their final destination, and in particular preventing packets that lack a destination address. The filters 122, 128 examine each of the packets going in and out of the router 100, and may perform filtering, rerouting, proxy services or firewall tasks on incoming packets. The filters may prevent packets of an unauthorized IoT Cloud server 111, 112, 113 from entering the agent 117 to have the service performed and sent along to the IoT servers 111, 112, 113.

As to example uses, the secure tunnels may be used in a hospital environment, for example wherein IoT devices used on medical equipment and patient monitoring equipment may be of various complexity and processing power, yet secure tunnels according to the present invention allow the data to be sent from the IoT devices to the IoT router securely. Similarly, a vehicle contains a multitude of IoT devices monitoring the mechanical components as well as comfort/convenience components of the vehicle, and using the present invention the communications from the IoT device IoT devices to the IoT router are secure.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

The invention claimed is:

1. A method for the maintenance and creation of security tunnels between IoT devices and IoT cloud servers, comprising the steps of:
   a. receiving one or more packets from one or more IoT devices;
   b. decrypting the one or more packets with a first protocol;
   c. re-encrypting the one or more packets with a second protocol;
   d. sending the one or more packets by a cloud secure tunnel to one or more IoT cloud servers; and
   e. receiving configuration information,
   wherein secure tunnels are formed between the one or more IoT devices and a smart router using a unique password for each IoT device, and
   wherein the router uses a look-up table to find the password for an IoT device based on its MAC address, and to attribute the communication to the IoT device.

2. The method of claim 1, further comprising the step of selectively stopping communication between the IoT devices and the smart router in connection with the communication of one IoT device to the router being compromised.

3. The method of claim 1, wherein the router uses a look-up table to find the password for an IoT device based on its MAC address, and to attribute the communication to the IoT device.

4. The method of claim 1, further comprising a step of performing a second authorization.

5. The method of claim 1, wherein the router filters the one or more packets incoming from the IoT devices by network addresses, ports connection state, or application level filtering.

6. A device for the maintenance and creation of security tunnels between IoT devices and IoT cloud servers, comprising:
   a. a router comprising:
      i. an IoT port adapted to wirelessly connect to one or more IoT devices;
      ii. a WAN port adapted to connect to one or more IoT cloud servers;
      iii. a filter separating packets passing through the router from IoT cloud packets that have a destination address of at least one IoT cloud server;
      iv. an agent means for providing one or more services to be administered to a packet entering the agent;
      v. a direct line to the WAN port for the packets passing through;
      vi. a first active service path connected between the IoT filter and the agent;
      vii. a second active service path connected between the agent and the WAN filter, the paths adapted for transmission of the IoT cloud packets;
      viii. a WAN port connected to the WAN filter, adapted to forward the IoT packets; and
   b. a configuration agent securely connected to the router, adapted to securely provide configuration information from the IoT cloud to the router,
   wherein the one or more services comprise at least decrypting the packet with a first protocol and re-encrypting the packet with a second protocol.

7. The device of claim 6 wherein the decrypting the packet uses a first cryptographic algorithm, and wherein the encrypting the packet uses a second cryptographic algorithm.

8. A smart router having a processor for communication with one or more IoT devices, the processor comprising:
   a. an IoT port adapted to wirelessly connect to the one or more IoT devices;
   b. a WAN port adapted to connect to one or more IoT cloud servers;
   c. an agent providing one or more services to be administered to a packet entering the agent;
   d. an IoT filter separating packets passing through the router from one of the one or more IoT devices that have a destination address of another of the one or more IoT devices;
   e. a first active service path connected between the IoT filter and the agent;
   f. a WAN filter separating packets passing through the router from IoT cloud packets that have a destination address of at least one IoT cloud server;
   g. a direct line to the WAN port for the packets passing through; and
   h. a secure connection to a configuration agent to provide configuration information to the agent of the smart router,
   wherein the one or more services to be administered by the agent comprises at least decrypting the packet and re-encrypting the packet.

9. The smart router of claim 8, further comprising a second active service path connected between the IoT filter and the agent.

* * * * *